Aug. 18, 1959    A. A. DUNKERLEY    2,899,741
CAMSHAFT BEARING INSTALLING TOOL
Filed Nov. 15, 1956    2 Sheets-Sheet 1
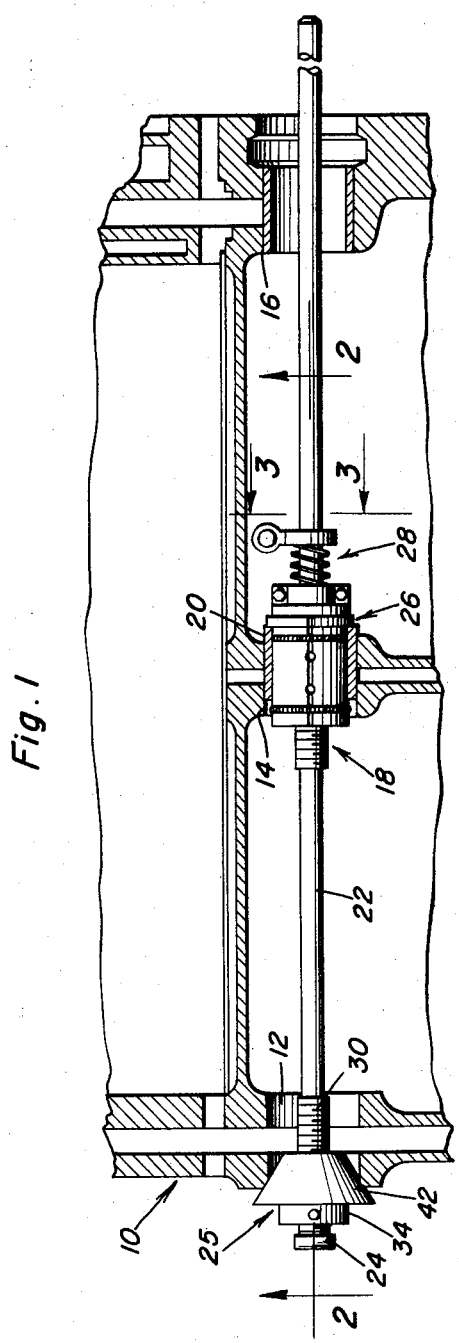
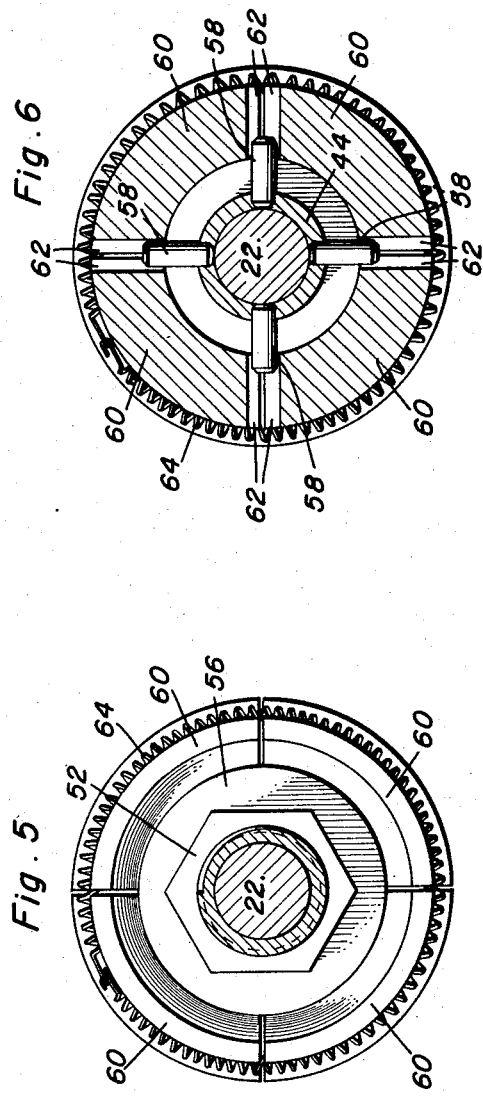
Arthur A. Dunkerley
INVENTOR.

Aug. 18, 1959  A. A. DUNKERLEY  2,899,741
CAMSHAFT BEARING INSTALLING TOOL
Filed Nov. 15, 1956  2 Sheets-Sheet 2
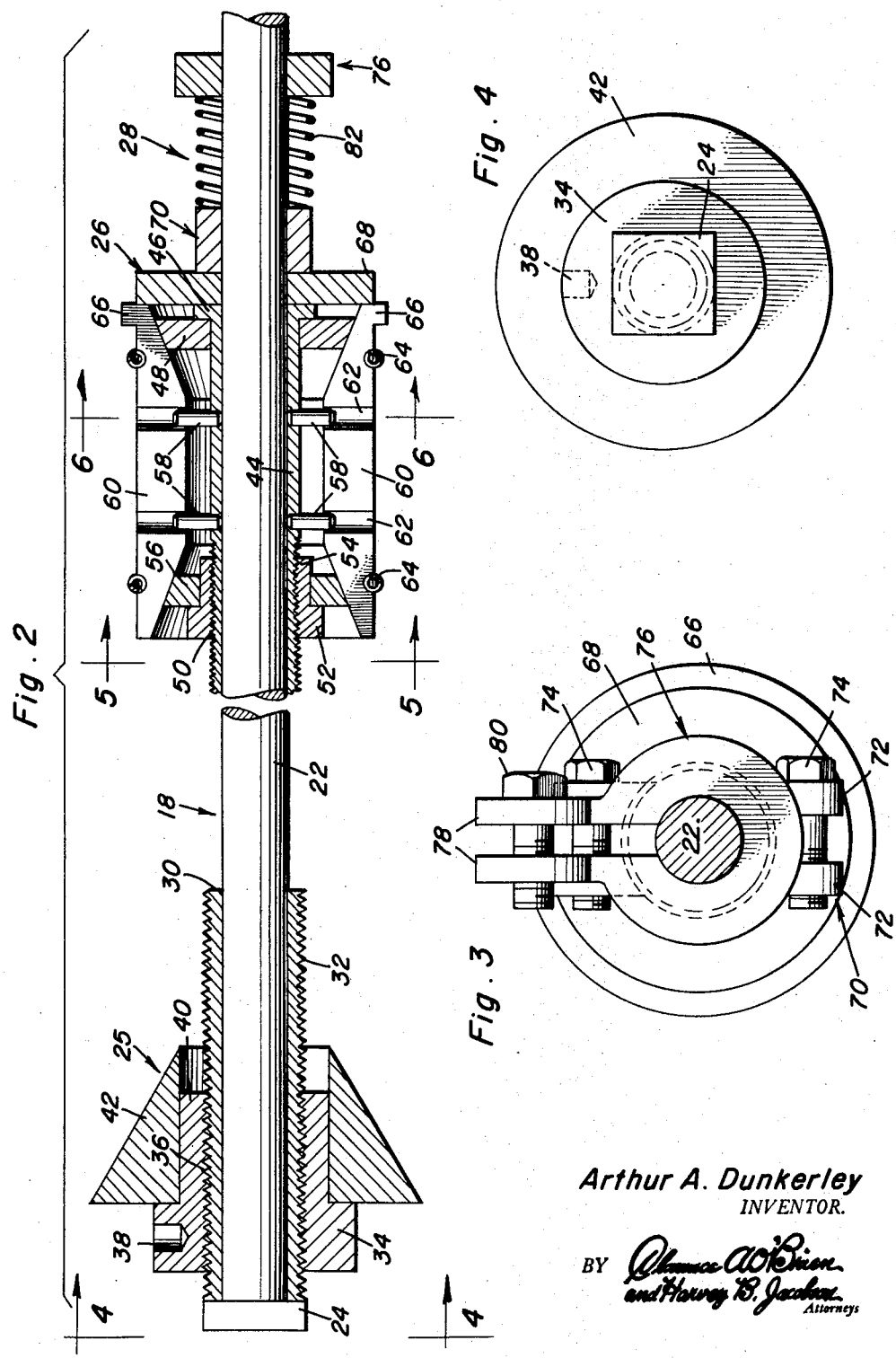
Arthur A. Dunkerley
INVENTOR.

United States Patent Office 2,899,741
Patented Aug. 18, 1959

2,899,741

CAMSHAFT BEARING INSTALLING TOOL

Arthur A. Dunkerley, Los Angeles, Calif.

Application November 15, 1956, Serial No. 622,427

7 Claims. (Cl. 29—263)

This invention relates in general to new and useful improvements in tools for internal combustion engines and more specifically to a camshaft bearing installing tool.

Heretofore in the installing of camshaft bearings an elongated shaft having a bearing carrying plug has been used. While such a tool has proved satisfactory over a period of years, it is necessary that there be provided one plug for each type of camshaft bearing installed. In the past, engine design was relatively slow in changing and only a limited number of plugs were required. However, at the present time camshaft bearings are being changed very frequently, and, as a result, if one were to use the old type of tool, many plugs would be required. It is impractical for a small shop operator to own a camshaft bearing installing tool requiring so many plugs, both from a financial standpoint and from the standpoint of being able to keep track of such plugs. It is therefore the primary object of this invention to provide a camshaft bearing installing tool which is provided with an adjustable mandrel, whereby a single tool will accommodate camshaft bearings of many different sizes.

Another difficulty of existing camshaft bearing installing tools is the fact that normally a small shop operator must replace the bearings by himself. During the initial starting of the bearing in the opening in the engine block it is necessary that one hand support the plug and bearing while the other hand turns the pulling nut to pull the bearing into place. This is very awkward, inasmuch as the two are spaced and in some engines it is impossible to do. It is therefore another object of this invention to provide adjustable clamps which will engage a camshaft bearing mandrel and which will permit the initial positioning of the camshaft bearing and the holding of the bearing and installing tool in place until such time as the installing tool and bearing may be completely positioned so that the use of the tool may then be free to go to the end of the engine block and turn the pulling nut to pull the camshaft bearing in place.

A further object of this invention is to provide an improved camshaft bearing installing tool which includes an adjustable camshaft bearing mandrel, the mandrel being of the expandible jaw type and being provided with an additional set of jaws, each set of jaws having a shoulder extending out at about .055 inch from the body of the jaws whereby one camshaft bearing tool with three complete sets of jaws may remove and install all existing camshaft bearings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary sectional view taken through an engine block and shows a camshaft bearing tool in use installing the center camshaft bearing;

Figure 2 is an enlarged longitudinal sectional view taken substantially upon the plane indicated by the section line 2—2 of Figure 1 and shows the specific details of the components of the camshaft bearing installing tool, an intermediate and an end portion of the shaft being broken away;

Figure 3 is an enlarged transverse sectional view taken substantially upon the plane indicated by the section line 3—3 of Figure 1 and shows the specific details of the initial pulling clamp and the final clamp of the tool, the tool being illustrated as removed from the engine block for purposes of clarity;

Figure 4 is an enlarged transverse view taken substantially upon the plane indicated by the section line 4—4 of Figure 2 and shows the specific details of the construction of the pulling and centering end of the tool;

Figure 5 is an enlarged transverse sectional view taken substantially upon the plane indicated by the section line 5—5 of Figure 2 and shows generally the details of the adjustable bearing supporting mandrel; and Figure 6 is an enlarged transverse sectional view taken substantially upon the plane indicated by the section line 6—6 of Figure 2 and shows further the details of the adjustable mandrel.

Referring now to the drawings in detail, it will be seen that there is illustrated in Figure 1 an engine block which is referred to in general by the reference numeral 10. The engine block 10 is provided with aligned camshaft bearing openings 12, 14 and 16, the camshaft bearing openings 14 being the centermost of the three. As illustrated in Figure 1, a camshaft bearing installing tool, which is the subject of this invention, is referred to by the reference numeral 18 and is being used to position a camshaft bearing 20 in the center opening 14. The camshaft bearing installing tool 18 includes an elongated shaft 22 which is provided at one end thereof with a head 24. Positioned at the one end of the shaft 22 is a combined centering and pulling unit which is referred to in general by the reference numeral 25. Slidably mounted on an intermediate portion of the shaft 22 is an adjustable bearing supporting mandrel which is referred to in general by the reference numeral 26. Disposed on the shaft 22 remote from the centering and pulling unit 25 and in abutment with the adjustable mandrel 26 are means for pivotal movement of the adjustable mandrel 26, the means being referred to in general by the reference numeral 28.

The combined centering and pulling unit 25 includes an elongated sleeve 30 which is journaled on the shaft 22 and suitably secured thereto against rotation. It is preferable that the sleeve 30 be replaceable in the event external threads 32 thereof are damaged. The sleeve 30 has one end thereof in abutment with the head 24.

Threadedly engaged on the sleeve 30 is an internally threaded nut member 34 which will be considered a pulling member. The nut member 34 is provided with internal threads 36 which engage the threads 32. It is intended that the nut member 34 be turned with a spanner wrench (not shown) and, accordingly, it is provided with a spanner wrench receiving bore 38. If desired, the nut member 34 may be machined to receive a wrench or other type of turning tool.

The nut member 34 is provided with a reduced portion 40 on which there is journaled a conical centering member 42. The conical centering member 42 is intended to be fixedly positioned in the endmost bearing receiving opening of an engine block, such as the engine block 10, and is to remain stationary while the nut member 34 turns therein.

The adjustable mandrel 26 includes an elongated sleeve 44 which is slidably and rotatably journaled on the shaft 22. The sleeve 44 is provided at one end with a head 46. Slidably and rotatably journaled on the sleeve 44 is a fixed centering cone 48. The centering cone 48 engages the head 46 and movement thereof is restricted by the head 46.

The opposite end of the sleeve 44 from the head 46 is provided with external threads 50. Threadedly engaged on the threads 50 is an internally threaded adjusting member 52. The adjusting member 52 has a reduced end portion 54 on which there is journaled a movable centering cone 56. The centering cones 48 and 56 are disposed in opposed relation. Carried by a central portion of the sleeve 44 is a plurality of radiating aligning pins 58. The aligning pins 58 are arranged in circumferentially spaced pairs, the individual aligning pins of each pair being longitudinally spaced.

The adjustable mandrel 26 also includes a set of adjustable jaws 60. Each jaw 60 is preferably in the form of a quadrant and is provided on opposite edges thereof with semi-circular cross sectional recesses 62 for receiving the aligning pins 58. Thus, the jaws 60 are prevented from movement relative to the sleeve 44 both longitudinally and circumferentially. The jaws 60 are retained against the cones 48 and 56 by means of elastic members 64 which encircle the jaws 60 and which are at least partially seated in the jaws 60. The elastic members 64 are preferably in the form of spring elements, as is best illustrated in Figures 5 and 6. The spring elements 64 are removable to permit the removal of the jaws 60. The ends of the jaws 60 remote from the centering and pulling unit 25 are provided with annular shoulder portions 66 to facilitate the engagement of an edge of a bearing to be installed.

It is to be understood that one set of jaws 60 will not suffice for all camshaft bearings. However, it has been found that a total of three sets of jaws will be sufficient to install all existing sizes of camshaft bearings.

The means 28 includes a washer 68 which bears against the end of the adjustable mandrel 26 remote from the centering and pulling unit 25. Disposed in abutment with the washer 68 is a final pulling clamp 70. The final pulling clamp 70 is of the split type and includes a pair of halves 72 which are connected together by a pair of fasteners 74.

The means 28 also includes an initial pulling clamp 76. The pulling clamp 76, as is best illustrated in Figure 3, is of a one-piece construction, but is split and includes a pair of clamping ears 78 which are urged together by a fastener 80 to facilitate the clamping of the clamp 76 on the shaft 22. Disposed intermediate the clamps 70 and 76 is a coil spring 82 which is positioned on the shaft 22. The spring 82 is compressed in the initial positioning of the camshaft bearing 20 by the tool 18.

In the use of the camshaft bearing installing tool 18, assuming that it is desired to install the bearing 20 in the engine block 10, as is illustrated in Figure 1, the initial bearing will be removed by any suitable tool, including the tool 18, if it is so desired. The new bearing 20 is placed on the mandrel 26 and the mandrel 26 adjusted to firmly grip the bearing 20. The tool 18 is then slid through the end of the engine block, the combined centering and pulling unit 25 having already been mounted on the shaft 22. After the end of the shaft 22 remote from the head 24 has passed through the bearing receiving opening 14, the adjustable mandrel 26 and the means 28 are slid on the shaft 22, after which the shaft 22 is moved entirely through the engine block 10 to the position substantially illustrated in Figure 1.

Inasmuch as the adjustable mandrel 26 has no centering means, and since it is impractical to attempt to place centering means on the opposite end of the shaft 22 remote from the combined centering and pulling unit 25, it will be seen that the shaft 22 must be centered by the conical centering member 42 and the initial engagement of the bearing 20 in the bearing receiving opening 14. Thus, it is normally required that the operator of a camshaft bearing installing tool use one hand to turn the pulling member, such as the nut member 34, and the other hand to steady the mandrel and the bearing 20. However, in the present instance, the centering member 42 is centered in the opening 12 by pulling on the shaft 22, and once the bearing 20 has been initially positioned relative to the bearing receiving opening 14, the initial pulling clamp 76 is shoved towards the mandrel 26 until the spring 82 is compressed. Then the fastener 80 is tightened down to clamp the clamp 76 on the shaft 22. After this has been accomplished, the spring 82 will hold the bearing 20 in a centered position with respect to the bearing receiving opening 14, leaving both hands of the operator free. The operator may then tighten down on the fastener 74 to set the final pulling clamp 70 on the shaft 22. Once this has been accomplished, the operator is free to turn the pulling nut 34 to pull the mandrel 26 and the bearing 20 through the bearing receiving opening 14 until the bearing 20 is positioned properly in the bearing receiving opening 14. The clamps 70 and 76 may then be released and the shaft 22 pulled out of the engine block 10, after which the mandrel 26 may be removed from the bearing 20.

At this time it is pointed out that the annular shoulder parts 66 of the jaws 60 are of lesser heights than the thickness of the bearings to be installed, and, as a result, the mandrel 26 will pass through any bearing opening for the intended bearing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A camshaft bearing installing tool comprising an elongated shaft, an adjustable camshaft bearing supporting mandrel slidably mounted on said shaft, a combined centering and pulling unit on one end of said shaft, and means for limiting movement of said adjustable mandrel on said shaft away from said centering and pulling unit, said means including an initial pulling clamp positioned remote from said adjustable mandrel, a final pulling clamp disposed immediately adjacent said adjustable mandrel, and a compressible spring positioned on said shaft and extending between said initial pulling clamp and said final pulling clamp.

2. A camshaft bearing installing tool comprising an elongated shaft, and adjustable camshaft bearing supporting mandrel slidably mounted on said shraft, a combined centering and pulling unit on one end of said shaft, and means for limiting movement of said adjustable mandrel on said shaft away from said centering and pulling unit, said adjustable mandrel including a sleeve journaled on said shaft, a fixed expanding cone at one end of said sleeve, a movable expanding cone at the opposite end of said sleeve, jaw aligning pins carried by said sleeve, a plurality of jaws mounted on said sleeve, said jaws being constantly engaged by said cones and being positioned by said cones and said aligning pins, elastic members encircling said jaws and urging said jaws towards said sleeve.

3. A camshaft bearing installing tool comprising an elongated shaft, an adjustable camshaft bearing supporting mandrel slidably mounted on said shaft, a combined centering and pulling unit on one end of said shaft, and means for limiting movement of said adjustable mandrel on said shaft away from said centering and pulling unit, said combined centering and pulling unit including a conical centering member for insertion in a camshaft bearing opening, a pulling member threaded for movement along said shaft, said centering member being journaled on said pulling member with said pulling member being rotatable therein, said adjustable mandrel including a sleeve journaled on said shaft, a fixed expanding cone at one end of said sleeve, a movable expanding cone at the opposite end of said sleeve, jaw aligning pins carried by said sleeve, a plurality of jaws mounted on said sleeve, said jaws being constantly engaged by said cones and being positioned by said cones and said aligning pins, elastic members encircling said jaws and urging said jaws towards said sleeve.

4. A camshaft bearing installing tool comprising an elongated shaft, an adjustable camshaft bearing supporting mandrel slidably mounted on said shaft, a combined centering and pulling unit on one end of said shaft, and means for limiting movement of said adjustable mandrel on said shaft away from said centering and pulling unit, said combined centering and pulling unit including a conical centering member for insertion in a camshaft bearing opening, a pulling member threaded for movement along said shaft, said centering member being journaled on said pulling member with said pulling member being rotatable therein, said means including an initial pulling clamp positioned remote from said adjustable mandrel, a final pulling clamp disposed immediately adjacent said adjustable mandrel, and a compressible spring positioned on said shaft and extending between said initial pulling clamp and said final pulling clamp.

5. A camshaft bearing installing tool comprising an elongated shaft, an adjustable camshaft bearing supporting mandrel slidably mounted on said shaft, a combined centering and pulling unit on one end of said shaft, and means for limiting movement of said adjustable mandrel on said shaft away from said centering and pulling unit, said adjustable mandrel including a sleeve journaled on said shaft, a fixed expanding cone at one end of said sleeve, a movable expanding cone at the opposite end of said sleeve, jaw aligning pins carried by said sleeve, a plurality of jaws mounted on said sleeve, said jaws being constantly engaged by said cones and being positioned by said cones and said aligning pins, elastic members encircling said jaws and urging said jaws towards said sleeve, said means including an initial pulling clamp positioned remote from said adjustable mandrel, a final pulling clamp disposed immediately adjacent said adjustable mandrel, and a compressible spring positioned on said shaft and extending between said initial pulling clamp and said final pulling clamp.

6. A camshaft bearing installing tool comprising an elongated shaft, an adjustable camshaft bearing supporting mandrel slidably mounted on said shaft, a combined centering and pulling unit on one end of said shaft, and means for limiting movement of said adjustable mandrel on said shaft away from said centering and pulling unit, said combined centering and pulling unit including a conical centering member for insertion in a camshaft bearing opening, a pulling member threaded for movement along said shaft, said centering member being journaled on said pulling member with said pulling member being rotatable therein, said adjustable mandrel including a sleeve journaled on said shaft, a fixed expanding cone at one end of said sleeve, a movable expanding cone at the opposte end of said sleeve, jaw aligning pins carried by said sleeve, a plurality of jaws mounted on said sleeve, said jaws being constantly engaged by said cones and being positioned by said cones and said aligning pins, elastic members encircling said jaws and urging said jaws towards said sleeve, said means including an initial pulling clamp positioned remote from said adjustable mandrel, a final pulling clamp disposed immediately adjacent said adjustable mandrel, and a compressible spring positioned on said shaft and extending between said initial pulling clamp and said final pulling clamp.

7. A camshaft bearing installing tool comprising an elongated shaft, an adjustable camshaft bearing supporting mandrel slidably mounted on said shaft, a combined centering and pulling unit at one end of said shaft, and means for limiting movement of said adjustable mandrel on said shaft away from said centering and pulling unit, said adjustable mandrel including a sleeve journaled on said shaft, a fixed expanding cone at one end of said sleeve, a movable expanding cone at the opposite end of said sleeve, jaw aligning pins carried by said sleeve, a plurality of jaws mounted on said sleeve, said jaws being constantly engaged by said cones and being positioned by said cones and said aligning pins, elastic members encircling said jaws and urging said jaws towards said sleeve, and said jaws having on the ends thereof adjacent sections of an outwardly projecting annular flange for engaging an end of a bearing to assure movement of the bearing with said mandrel.

References Cited in the file of this patent

UNITED STATES PATENTS

| | | |
|---|---|---|
| 1,710,902 | Stachowski | Apr. 30, 1929 |
| 1,972,455 | Miller | Sept. 4, 1934 |
| 2,067,442 | Frisz | Jan. 12, 1937 |
| 2,226,078 | Spahn | Dec. 24, 1940 |
| 2,287,767 | Dodge | June 30, 1942 |
| 2,648,563 | Hall | Aug. 11, 1953 |
| 2,775,025 | Williams | Dec. 25, 1956 |